No. 781,186. PATENTED JAN. 31, 1905.
G. L. CHATFIELD.
BELT TIGHTENER.
APPLICATION FILED AUG. 8, 1904.
2 SHEETS—SHEET 1.
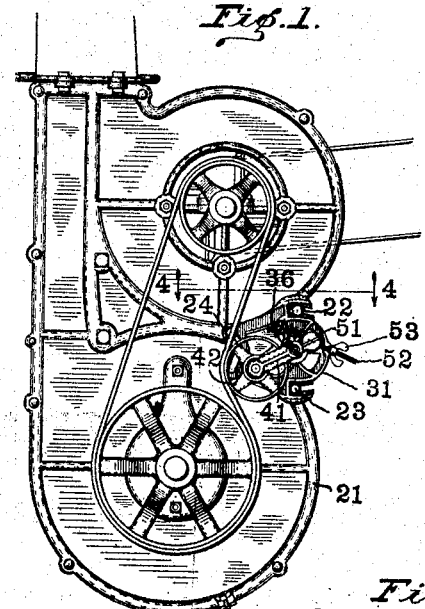
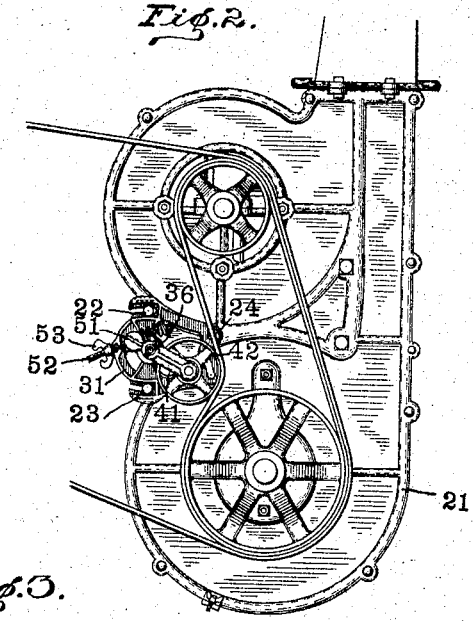
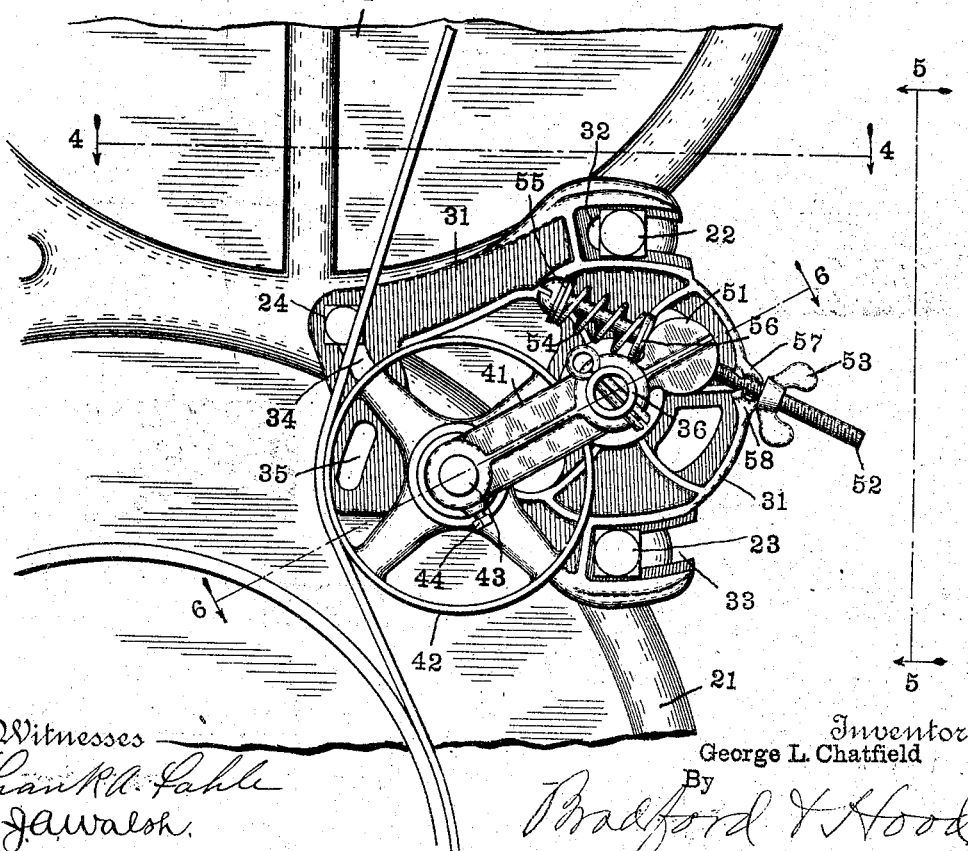
Witnesses
Frank R. Fahle
J. A. Walsh.
Inventor
George L. Chatfield
By
Bradford & Hood,
Attorneys

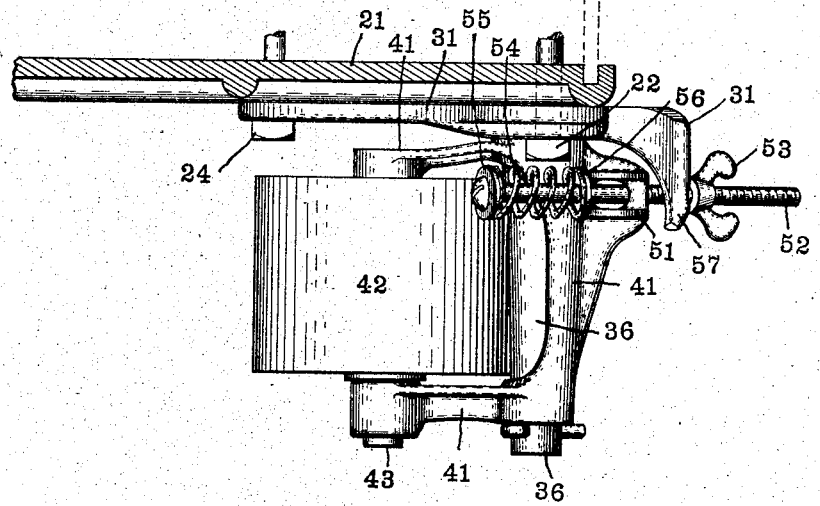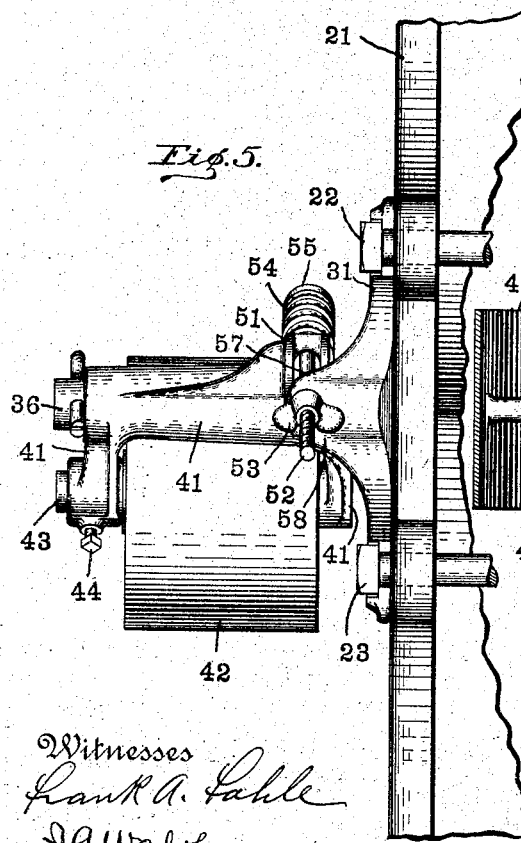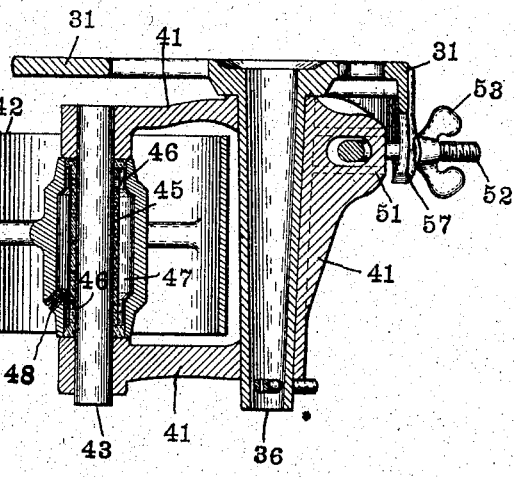

No. 781,186. Patented January 31, 1905.

UNITED STATES PATENT OFFICE.

GEORGE L. CHATFIELD, OF INDIANAPOLIS, INDIANA, ASSIGNOR TO THE PNEUMATIC ELEVATOR AND WEIGHER COMPANY, OF INDIANAPOLIS, INDIANA, A CORPORATION OF INDIANA.

BELT-TIGHTENER.

SPECIFICATION forming part of Letters Patent No. 781,186, dated January 31, 1905.

Application filed August 8, 1904. Serial No. 219,901.

*To all whom it may concern:*

Be it known that I, GEORGE L. CHATFIELD, a citizen of the United States, residing at Indianapolis, in the county of Marion and State of Indiana, have invented certain new and useful Improvements in Belt-Tighteners, of which the following is a specification.

My present invention is designed especially for use upon the housings of the pneumatic elevators which form the subject-matter of the Schuman patents, of which No. 623,109, dated April 11, 1899, and No. 641,045, dated January 9, 1900, are leading examples. In machines of the class in question there are two shafts within a short distance of each other (one of which is arranged nearly perpendicularly above the other) carrying appropriate pulleys, around which a short belt passes, whereby one of said shafts is driven from the other. The shafts themselves are not adjustable to any appreciable extent, and they are designed to run at a comparatively high speed. The shafts and bearings being small, the belt at no time should be excessively tight, for the reason that such excessive tightness causes friction in and consequent heating and wearing of the bearings, while on the other hand unless the belt is reasonably tight it will slip, so that the driven shaft will not be driven at the proper speed. Small belts of this character inevitably stretch under use, and it has therefore, heretofore, been necessary to frequently cut such belts in order to maintain the proper tension, and as this is often carelessly done by unskilled operators the result has been that the belt is apt to be too tight at times and too loose at other times, with the result that the machine has thereby been caused to work imperfectly. These machines are made both "right-hand" and "left-hand," as it is called, in order to accommodate them to the varying sorts of grain-separators or threshing-machines to which they are attached, and it is therefore highly desirable that any means which is provided for overcoming the difficulties in question should be adapted to be used indifferently upon either of the housings. This requires that the construction and arrangements of the parts shall be such that the direction of strain may be shifted from one side to the other of the pulley-support.

It is the object of my invention to provide a belt-tightener which shall meet the requirements of the situation described.

Referring to the accompanying drawings, which are made a part hereof, and on which similar reference characters indicate similar parts, Figure 1 is a side elevation of what is denominated a "left-hand" housing equipped with one of my improved belt-tighteners; Fig. 2, a similar view of a right-hand housing; Fig. 3, an elevation of the belt-tightener and immediately adjacent parts, similar to a portion of Fig. 1, but on a considerably-enlarged scale; Fig. 4, a top or plan view of the said belt-tightener as seen when looking downwardly from the dotted line 4 4 in Figs. 1 and 3; Fig. 5, an elevation as seen from the dotted line 5 5 alongside Fig. 3, and Fig. 6 a sectional view as seen when looking in the direction indicated by the arrows from the dotted line 6 6 in Fig. 3.

The machine-housing 21 shown is similar to that illustrated in the drawings of the Schuman patents above referred to, and as the same forms no part of my present invention it will not be further described herein except incidentally in describing the invention. This housing is regularly provided with the several bolts 22, 23, and 24, and these bolts are utilized in attaching the frame of my belt-tightener to said housing. The said belt-tightener frame 31 has four slots 32, 33, 34, and 35, which I utilize in securing it to the housing by means of the bolts 22, 23, and 24 above mentioned. These slots are so arranged as to permit of a considerable adjustment of the tightener-frame upon the housing. In applying the belt-tightener to a left-hand housing the bolts are inserted in the slots 32, 33, and 34, while in applying it to a right-hand housing they are inserted in the slots 32, 33, and 35. The slots 32 and 33 are substantially segments of a circle struck from the center of the belt-tightener frame, while the slots 34 and 35 extend on angles toward each other in such a direction as to permit of the adjustment of that end of the frame in respect to the bolt 24, while the other slots 32 and 33 move upon the bolts 22 and 23 in revolving the frame 31 upon its center. By this means I am enabled to secure a considerable adjustment of the position of the belt-tightener as a whole, and thus increase its range of efficient action. At the working center of the frame 31 I form a stud-shaft 36, upon which the pulley-housing 41, carrying the tightener-pulley 42 by means of its shaft 43, is mounted. This stud-shaft, as shown, I prefer to make integral with the frame and also to make it hollow for the purposes of lightness, the whole structure being preferably a malleable casting. The pulley-housing 41 is also preferably a malleable casting and is adapted to be moved upon and oscillate about the stud-shaft 36. In the ends of its arms I mount the shaft 43, which is preferably a piece of ordinary steel shaft and which is held firmly therein, as by a set-screw 44.

The pulley 42 is preferably made with a chamber in its hub to contain a lubricant, and the part 45, which comes immediately in contact with the shaft 43, I prefer to make in the form of a bushing (preferably of bronze) and which when in place constitutes one wall of the lubricant-chamber 47. An opening (normally closed by a screw-plug 48) is provided for the admission of lubricant to the chamber, and a small perforation 46 through the bushing permits said lubricant to reach the shaft. The pulley being quite small runs at a very high speed, and by this means I am enabled to secure sufficient lubrication, and consequently a long wearing life.

The pulley-housing 41 has a tailpiece 51 extending out on the opposite side of its hub from the arms carrying the pulley-shaft, and with this a spring-holder engages, said holder being composed of a bolt 52, having a wing-nut 53 and a compression-spring 54 surrounding said bolt, said spring being interposed between the head of said bolt and an appropriate bearing on the side of the tailpieces 51. I prefer to also interpose washers 55 and 56 as the immediate contact-pieces for said spring; but these are obviously merely a matter of choice. The bolt 52 passes between a pair of fingers 57 and 58 on the frame 31, which are so formed and arranged as to constitute a suitable bearing for the nut 53 in whatever position the parts are placed, the size and shape of said fingers being such as to permit the shifting of position of the bolt and nut as the housing 41 swings about the stud-shaft 36 either in operation or when shifted to work on the different housings.

Having thus fully described my said invention, what I claim as new, and desire to secure by Letters Patent, is—

1. The combination with a machine-housing having two shafts in relatively fixed position and a belt whereby one is driven from the other, of a self-adjustable belt-tightener consisting of a frame, a stud-shaft on said frame, a pulley-housing on said stud-shaft, a pulley carried in said housing, and a spring connection between the main belt-tightener frame and the pulley-housing, whereby the pulley carried by the latter is yieldingly held against the belt by which one of the machine-shafts is driven from the other.

2. The combination with a machine-housing containing two shafts and a belt-drive whereby one is driven from the other, of a belt-tightener adjustably secured to said machine-housing, the means of adjustment embodying slots two of which are substantially segmental to the pivot-center of the tightener-frame and another of which is at an angle which bisects a continuation of the said circle.

3. The combination with a machine-housing having two shafts, one of which is driven by a belt from the other, of a belt-tightener comprising a frame and a tightener-pulley carried thereby and adapted to come in contact with said belt, said frame being provided with a series of slots whereby it is enabled to be attached to the housing either side up by bolts in the housing in identical positions, and said bolts, whereby said belt-tightener is adapted to either right or left hand housings.

4. The combination, in a belt-tightener, of a frame embodying a stud-shaft, a pulley-housing mounted on said stud-shaft and carrying a pulley upon one side thereof and provided with a tailpiece upon the other side, said pulley, and a tension device engaging with said tailpiece and with projections upon the tightener-frame, said tension device consisting of a bolt, an appropriate nut and a suitable compression-spring.

5. The combination, in a belt-tightener, of a frame embodying a stud-shaft, a pulley-housing mounted on said stud-shaft and having suitable pulley-bearings upon one side thereof and a suitable tailpiece upon the other side, and the frame having suitable projections between which the stem of a spring-holder will pass, said spring-holder, and a spring therefor, said tailpiece and said projections being formed alike upon both sides, whereby the tightener, by merely shifting the spring-tension device and swinging the pulley-housing on its pivot, is adapted for use either as a right-hand or as a left-hand tightener.

In witness whereof I have hereunto set my hand and seal, at Indianapolis, Indiana, this 23d day of July, A. D. 1904.

GEORGE L. CHATFIELD. [L. S.]

Witnesses:
CHESTER BRADFORD,
JAMES A. WALSH.